United States Patent [19]
Johnson

[11] Patent Number: 5,380,140
[45] Date of Patent: Jan. 10, 1995

[54] MOBILE MATERIAL HANDLING APPARATUS FOR TRANSPORTING AND MANIPULATING A LOAD AND METHODS FOR USING SAME

[76] Inventor: Gerald B. Johnson, 35 Salsbury St., Meyersdale, Pa. 15552

[21] Appl. No.: 47,095

[22] Filed: Apr. 14, 1993

Related U.S. Application Data

[63] Continuation-in-part of Ser. No. 848,896, Mar. 10, 1992, abandoned.

[51] Int. Cl.6 .............................................. B60P 1/16
[52] U.S. Cl. .................................. 414/421; 414/492; 414/498; 414/635; 414/786; 414/629
[58] Field of Search ............... 414/421, 786, 632–639, 414/641, 663, 672, 469, 477, 491, 492, 498, 540, 546, 478; 298/1 A, 22 R

[56] References Cited

U.S. PATENT DOCUMENTS

| | | | |
|---|---|---|---|
| 505,749 | 9/1893 | Cardarelli | 414/633 |
| 1,719,197 | 7/1929 | Schlothan | 414/469 X |
| 2,027,421 | 1/1936 | Eisenberg, Jr. | 414/498 X |
| 2,284,661 | 6/1942 | Joy | 414/539 |
| 2,421,472 | 6/1947 | Way | 414/635 X |
| 2,603,368 | 7/1952 | Vance | 414/634 X |
| 2,672,247 | 3/1954 | Jewett | 414/421 |
| 2,726,115 | 12/1955 | Babcock et al. | 414/477 X |
| 2,875,839 | 3/1959 | Spinks | 414/498 X |
| 2,962,180 | 11/1960 | Vossenberg | 414/635 |
| 3,054,522 | 9/1962 | Peck | 414/635 |
| 3,071,270 | 1/1963 | Baker | 414/635 |
| 3,096,894 | 7/1963 | Proler et al. | 414/469 |
| 3,180,503 | 4/1965 | Shaw | 414/540 |
| 3,198,363 | 8/1965 | Snead | 414/469 X |
| 3,227,300 | 1/1966 | Kampert | 414/635 |
| 3,235,110 | 2/1966 | Kleysen | 414/635 |
| 3,412,882 | 11/1968 | Stockwell | 414/469 |
| 3,441,158 | 4/1969 | Wilson | 414/632 |
| 3,522,894 | 8/1970 | Tornheim | 414/469 |
| 3,647,097 | 3/1972 | Skaggs | 414/494 |
| 3,674,166 | 7/1972 | Dunbar | 414/469 |
| 3,684,110 | 8/1972 | Meyercord | 414/546 X |
| 3,790,013 | 2/1973 | Smith | 414/469 X |
| 3,848,758 | 11/1974 | Carter | 414/469 |
| 4,030,751 | 6/1977 | Bobka | 298/1 A |
| 4,129,333 | 12/1978 | Kidd | 298/222 |
| 4,325,666 | 4/1982 | Chain et al. | 414/540 X |
| 4,353,436 | 10/1982 | Rice et al. | 414/540 X |
| 4,621,972 | 11/1986 | Grotte | 414/477 |
| 4,629,391 | 12/1986 | Soyk et al. | 414/563 |
| 4,778,327 | 10/1988 | Tufenkian et al. | 414/541 |
| 4,790,711 | 12/1988 | Calaway | 414/540 X |
| 4,820,110 | 4/1989 | Efird | 414/458 |
| 4,963,070 | 10/1990 | Detrick | 414/635 X |
| 5,059,085 | 10/1991 | Kollar | 414/482 |
| 5,147,170 | 9/1992 | Detrick | 414/635 X |

FOREIGN PATENT DOCUMENTS

| | | | |
|---|---|---|---|
| 565537 | 3/1957 | Belgium | 414/635 |
| 706713 | 4/1954 | United Kingdom | 414/421 |
| 1253802 | 11/1971 | United Kingdom | |
| 956407 | 9/1982 | U.S.S.R. | 414/636 |
| 1370060A | 1/1988 | U.S.S.R. | |
| 82/0136 | 4/1982 | WIPO | |

OTHER PUBLICATIONS

Two pages of an owner's manual for a power carrier HP400 manufactured by Honda Motor Co., undated.

*Primary Examiner*—David A. Bucci
*Attorney, Agent, or Firm*—Kirkpatrick & Lockhart

[57] ABSTRACT

A material handling apparatus and methods for transporting and manipulating headstones are provided. The apparatus consists of a mobile carrier having a frame and a bed member pivotally attached thereto that is adapted to carry and support a headstone thereon. The bed member is pivotable between a horizontal position wherein it is carried on the frame of the mobile carrier to a position wherein it is perpendicular to the mobile carrier frame by a manually operated hydraulic cylinder. A support foot is attached to the end of the bed member to support the bottom of a headstone when the bed member is in the perpendicular position. The position of the support foot may be selectively adjusted with respect to the end of the bed member to enable the headstone to be placed on objects located at various heights above the ground level. A removable watertight container is also provided for hauling concrete solutions or crushed gravel.

21 Claims, 8 Drawing Sheets

MOBILE MATERIAL HANDLING APPARATUS FOR TRANSPORTING AND MANIPULATING A LOAD AND METHODS FOR USING SAME

BACKGROUND OF THE INVENTION

This application is a continuation-in-part of application Ser. No. 07/848,896, filed Mar. 10, 1992 now abandoned.

FIELD OF THE INVENTION

The present invention relates to material handling apparatus and, more particularly, is directed to mobile material handling devices for transporting and manipulating a headstone from a horizontal transportable position to a vertical position at a predetermined height.

DESCRIPTION OF THE INVENTION BACKGROUND

Headstones are employed in cemeteries to mark the location of individual grave sites and serve as a medium for memorializing information about the decedent. Headstones are typically fabricated from marble or granite materials and generally weigh 1000 pounds or more depending upon their size.

The process of transporting a headstone to a grave site and manipulating it to an upright position is known as stone setting and those who perform this process must be trained in the methods for handling headstones to minimize the chance of injuring themselves or causing damage to the headstone. The stone setting process is typically performed in two steps. The first step of the process consists of transporting the headstone in a vehicle from the manufacturer to the cemetery. The second step of the process consists of transporting the headstone from the vehicle to the grave site and manipulating it into a final upright position.

Trucks or other similar motor vehicles are typically employed to transfer the headstone from the manufacturer to the cemetery. However, due to the close proximity of the headstones to one another and the possibility of damaging the cemetery grounds by the truck's wheels, the headstone often must be transported from the truck to the grave site by other means that can be maneuvered between the headstones without damaging existing headstones and the cemetery grounds. In some instances, the headstone must be transported a great distance through the cemetery and up steep hills to reach the grave site.

One method commonly employed to transport a headstone from the truck to the grave site uses a manually operated four-wheeled dolly similar to those dollies used to move large appliances. The dolly is laid in a horizontal position on the ground and the headstone is transferred from the truck bed either manually or by a crane that is connected to the truck bed. To manually transfer the headstone from the truck bed to the dolly, boards are typically leaned onto the rear of the truck bed to create a ramp between the dolly and the truck bed. The headstone is then manually manipulated from the truck bed onto the boards and is then permitted slide down the boards onto the dolly. That method of transferring the headstone onto the dolly can be quite dangerous and must be carefully performed to prevent damaging the headstone as it slides down the boards onto the dolly.

After the headstone has been transferred to the dolly, the dolly must be manually pushed or pulled to the grave site. That process may be complicated by soft or water-soaked ground conditions which tend to cause the dolly wheels to sink into the ground thus making the dolly difficult to move. In instances where a hillside must be traversed to reach the grave site, a winch is commonly employed to winch the heavy headstone and dolly up the hill. More specifically, a length of pipe or rod is inserted into the hillside at a position above the dolly. The winch is then connected between the pipe and the dolly and the dolly is winched to the pipe. The pipe is then removed and the entire process is repeated until the dolly has been transported up the hillside. That process is very labor intensive, dangerous and time consuming and can damage the cemetery grounds.

After the headstone has been transported to the grave site, it must be unloaded from the dolly. That process requires the stone setters to manually push or pull the dolly to an upright position wherein the headstone can be slid from the bottom support ledge of the dolly and onto the ground. Depending upon the size and the weight of the headstone, many individuals may be required to transfer the headstone to the upright position.

Often, the headstone must be placed onto a base or foundation member that is raised above the ground level a distance of, for example, six to eight inches. In those situations, the stone setters must either advance the dolly wheels onto a makeshift ramp usually created by stacking loose boards together or, in the alternative, may unload the headstone onto the ground and then pry the headstone onto the base with pry bars. The latter method increases the possibility of damaging the headstone or the base during the lifting and prying process.

Also, because the headstones are constantly exposed to the elements and may also be subjected to acts of vandalism, it often becomes necessary sometime during the life of the headstone to take the headstone back to the manufacturer for refurbishing or repair. In those instances, a dolly is also used to transport the headstone from the grave site to the truck. The stone setter must transfer the headstone onto the dolly and then return the dolly to a horizontal position wherein it can be pushed or pulled to the truck. It will be appreciated that the above described methods and apparatus for handling and transporting a headstone are very time consuming and cumbersome to use. It will be further appreciated that the above-described methods often result in injury to the stone setter by virtue of the difficulty in manually moving and manipulating the heavy headstone.

In the material handling industry, several devices have been developed for unloading materials from mobile vehicles. For example, a tiltable loading and unloading truck bed is disclosed in U.S. Pat. No. 3,412,882. The truck bed disclosed in that patent has support forks non-movably attached thereto that are constructed for picking up large loads such as a stack of hay bales. The position of the forks, however, cannot be selectively adjusted with respect to the end of the tiltable bed to enable one to load or unload materials at different heights. Likewise, U.S. Pat. No. 3,522,894 discloses a tiltable truck bed that has a forklift mechanism movably attached thereto. The vertical position of the forklift platform, however, is dependent upon the inclination angle of the truck bed and, as such would be ill-suited for transporting and manipulating headstones in the manner described above.

Other material handling devices such as the ones disclosed in U.S. Pat. Nos. 4,963,070 and 5,147,170 to Detrick are equally ill-suited for performing the various transportation and manipulation tasks associated with handling headstones. In particular, the Detrick apparatuses are not adapted for travel on a variety of different terrain conditions. Also, the Detrick devices and others like them are not adapted to place an item on an upstanding foundation that is located on uneven terrain. For example, often the foundation upon which a headstone must be gently placed is located on sloping terrain. In those situations, the top surface of the foundation is typically located on an angle with respect to the ground surface. The prior apparatuses, such as those disclosed in the above-mentioned patents, all have support mechanisms that are not capable of assuming various angular positions with respect to the tiltable members to which they are attached. That is, support mechanisms of prior devices are fixed on a substantially horizontal position that is substantially parallel with the surface upon which the mobile device is traversing. Therefore, if one were to use those devices to place a headstone onto a foundation located on sloping or uneven terrain, one portion of the headstone would be held a certain distance above the foundation. Because the headstones are subject to being damaged should they be dropped a small distance onto a foundation, make-shift cribbing and/or support ramps must be manufactured in the field in order for the transport apparatus to be oriented at the proper angle. In particular, with this method, the transport device is driven onto the cribbing, thus causing the device to be tilted to an angle that substantially corresponds with the angle of the foundation. Such method is time consuming and may be unsafe depending upon the magnitude of the angle at which the transport device is positioned.

Thus, there is a need for a material handling device and method for transporting and manipulating a headstone from a horizontal transportable position to a vertical position, the height of which is selectively adjustable to various heights above the ground without the manual handling and manipulation normally associated with those procedures. There is a further need for a material handling device that can safely position a headstone onto a foundation that is located on uneven or slopping terrain.

SUMMARY OF THE INVENTION

The preferred embodiment of the present invention includes various unique features for facilitating the transportation of a headstone through a cemetery to a particular grave site and unloading that headstone either onto the ground or onto an elevated foundation without the manual labor commonly associated with those procedures. While these particular features are adapted for handling headstones, it will be understood that some of the features may be incorporated either singularly or together, into other material handling devices adapted to handle a variety of other materials.

In accordance with the present invention, there is provided a mobile material handling apparatus for transporting a headstone to a desired location and unloading the headstone therefrom at a predetermined height. The material handling apparatus consists of a mobile carrier that has a bed member pivotally attached thereto. The bed member is adapted to pivot between a first position wherein it rests on the frame of the mobile carrier to a second position wherein it is substantially perpendicular to the carrier frame. The bed member is pivoted between those first and second positions by a hydraulic cylinder that is attached to the bed member and the carrier frame.

Attached to the bottom of the bed member is a support foot that is adapted to support a headstone while the bed member is in the second position or being pivoted thereto. The support foot is attached to the bed member by a screw member and two rods that are slidably received in two corresponding sleeves that are attached to the bed member. The position of the support foot can easily be adjusted with respect to the end of the bed member by turning the screw member to cause the support foot to advance toward or away from the end of the bed member. As such, the support foot can be adjusted to a position wherein it will support the headstone at a predetermined height when the bed member has been pivoted to the second position. In another embodiment the support foot thereof is pivotally attached to the bed member to enable it to assume various angular orientations with respect to the bed member. The present invention may also include a removable water-tight container that is attached to the bed member for hauling concrete mixtures, crushed stone and the like to the grave site.

Accordingly, the present invention provides solutions to the aforementioned problems encountered when handling headstones. In particular, the present invention enables the headstone to be transported to a grave site without the time consuming manual labor normally involved with that process. The present invention also provides means for unloading the headstone in an upright position at a variety of predetermined heights and angles. For example, the headstone may be unloaded onto the ground or, in the alternative, the headstone may be unloaded onto a pad or foundation that is elevated above the ground level. Likewise, the present invention also provides means for removing a headstone from an elevated pad and then transporting the headstone through the cemetery grounds to a desired location without damaging the headstone or cemetery grounds. In addition, the present invention enables a headstone to be positioned on a foundation that is located on sloping or uneven terrain without the use of unsafe makeshift ramps or support cribbing.

As such, the added maneuverability afforded by the present invention enables one to transport and manipulate a headstone in a manner that is much safer than the prior methods and apparatus used to perform those procedures. The present invention, when properly used, will decrease the amount of damage caused to the headstone and the cemetery grounds that is occasionally encountered when using the prior methods. However, other details, objects and advantages will become apparent as the following detailed description of the present preferred embodiment thereof proceeds.

BRIEF DESCRIPTION OF THE DRAWINGS

In the accompanying drawings, I have shown a present preferred embodiment of the invention wherein like reference numerals are employed to designate like parts and wherein.

DETAILED DESCRIPTION OF THE PREFERRED EMBODIMENTS

Figure 1:
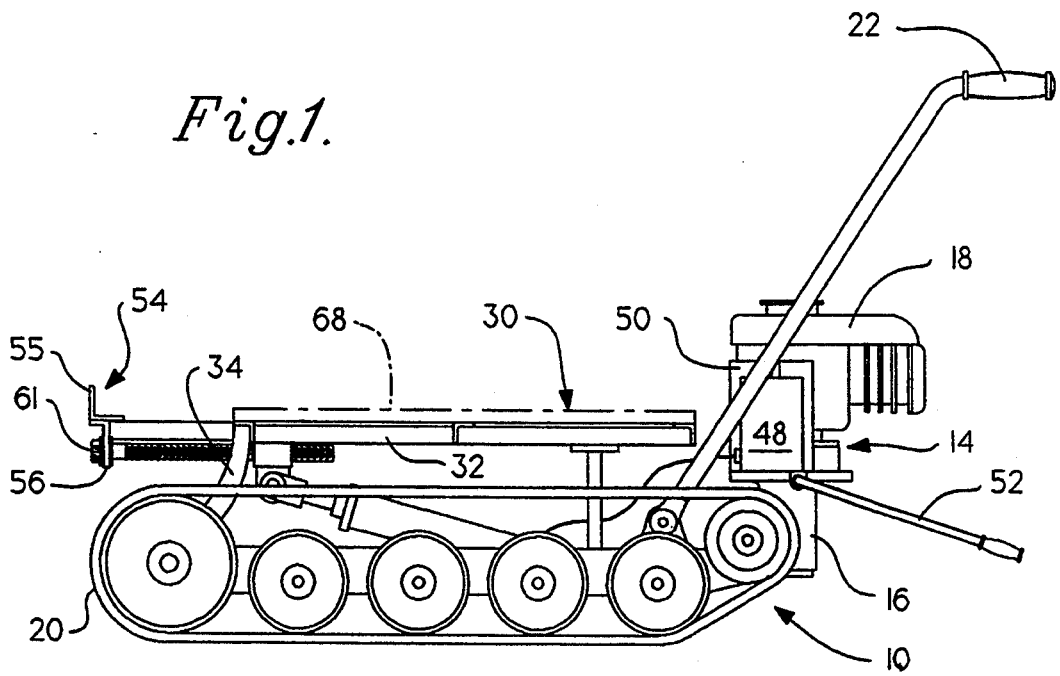
FIG. 1 is a side elevational view of the material handling apparatus of the present invention.

Referring now to the drawings for the purposes of illustrating the present preferred embodiment of the invention only and not for purposes of limiting the same, the Figures show a material handling apparatus generally designated as 10. While the material handling apparatus 10, as described below, is preferably constructed to support a headstone or other object weighing up to approximately 1000 pounds, those of ordinary skill in the art will appreciate that the present material handling apparatus 10, in accordance with applicable safety standards, may be constructed to accommodate both heavier and lighter loads of varying configurations.

More particularly and with reference to FIG. 1, there is shown a self-propelled mobile carrier 14 that has a bed member 30 attached thereto. The carrier 14 can be of a standard type having a frame 16, an engine 18, a pair of drivable tracks 20 and a pair of control handles 22. I have found the self-propelled, gasoline powered track mounted carrier manufactured by Honda Motor Co., Ltd., of Tokyo Japan under the mark Power Carrier HP400 to be well suited for this application. In particular, the driven tracks of the carrier permit the device to travel and maneuver on a variety of different terrain configurations often encountered in cemetaries. However, those of ordinary skill in the art will appreciate that the present invention may be used in a variety of other material handling applications and accordingly, the type, size and construction of the mobile carrier 14 may be varied to accommodate the type, size and weight of the load being hauled. In addition, depending upon the environment in which the material handling apparatus 10 will be used, the mobile carrier 14 may include wheels (not shown) instead of tracks. Furthermore, in some material handling applications, the mobile carrier 14 may have an electric motor and be battery powered or, in the alternative, the mobile carrier 14 may be manually propelled.

As can be seen in FIGS. 1-5, the bed member 30 consists of a frame 32 that is pivotally attached to the frame 16 of the mobile carrier 14. Preferably, the frame 32 is constructed from $1\frac{1}{4}" \times 1\frac{1}{4}" \times \frac{1}{4}"$ thick steel angle material that is welded together in the configuration illustrated in FIG. 2. However, the frame 32 may be fabricated from any material suited to withstand the weight of the material being manipulated and, accordingly, may be fastened together by any suitable fastening means. The frame member 32 includes a sufficient number of cross members 32', however I have found the frame configuration depicted in FIG. 2 to be well suited for supporting a typical headstone throughout the pivotal range of the bed member 30.

Figure 2:
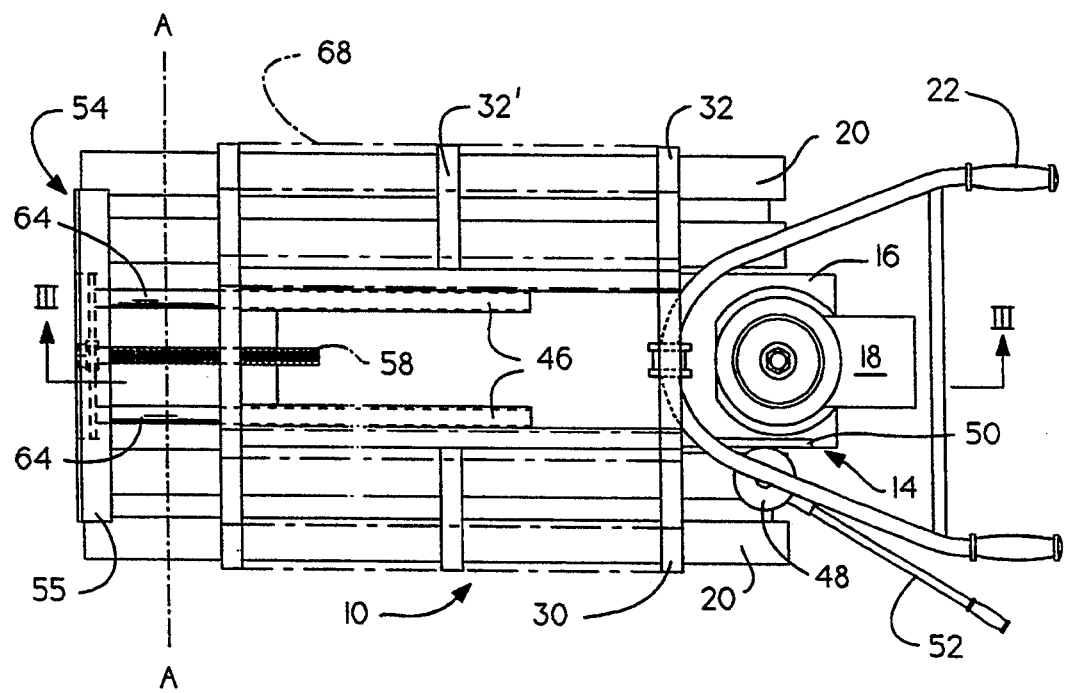
FIG. 2 is a top plan view of the material handling apparatus of the present invention.
Figure 3:
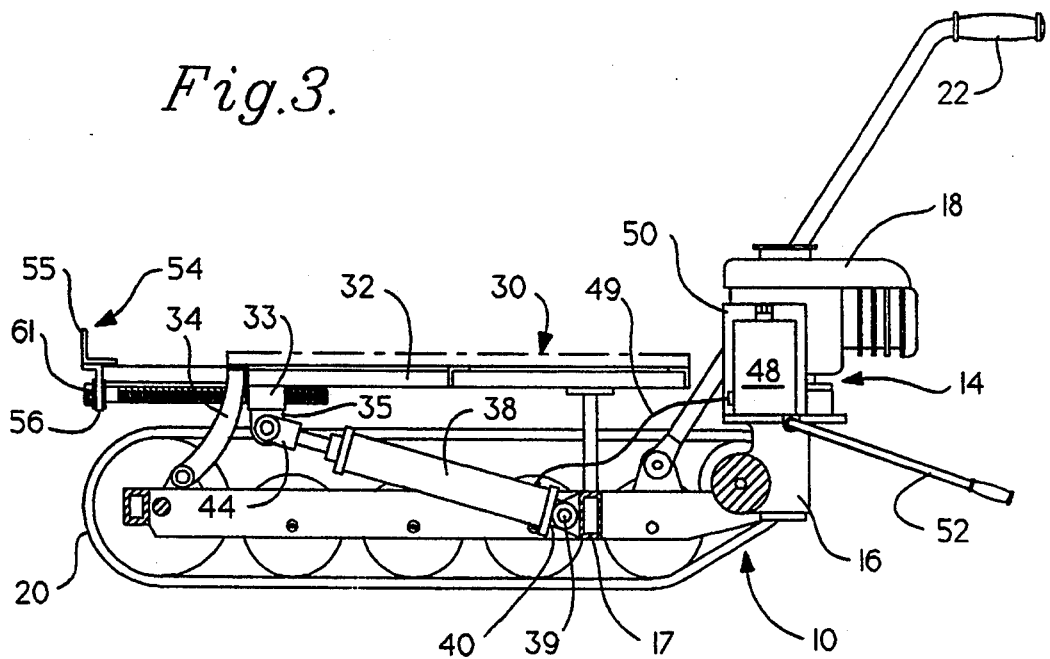
FIG. 3 is a side elevational view of the material handling apparatus of the present invention taken along line III—III in FIG. 2.
Figure 4:
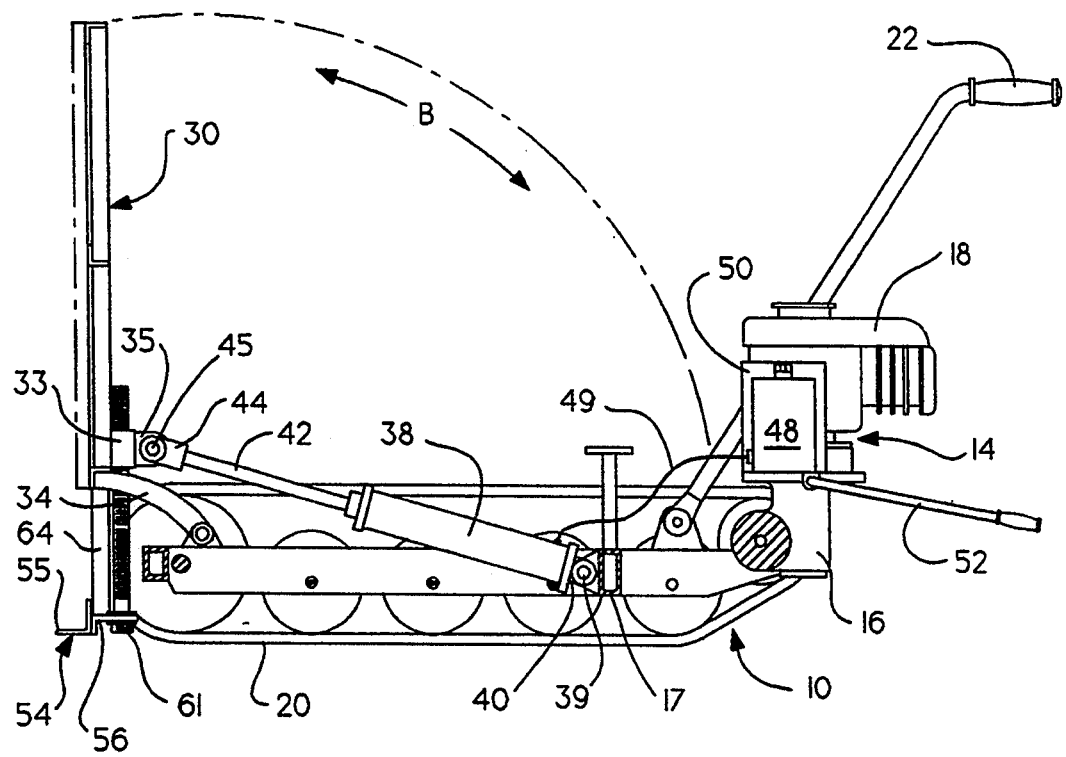
FIG. 4 is a side elevational view of the material handling apparatus of the present invention in an alternative position.
Figure 5:
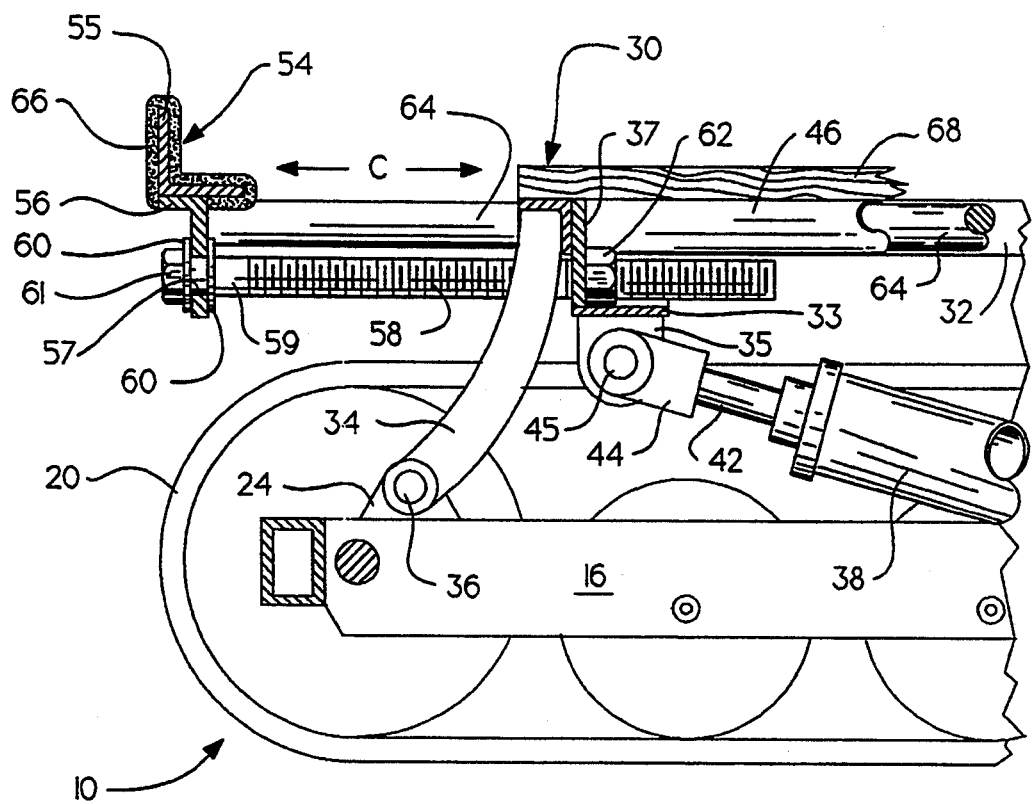
FIG. 5 is a partial side elevational view of a portion of the material handling apparatus of the present invention.
Figure 6:
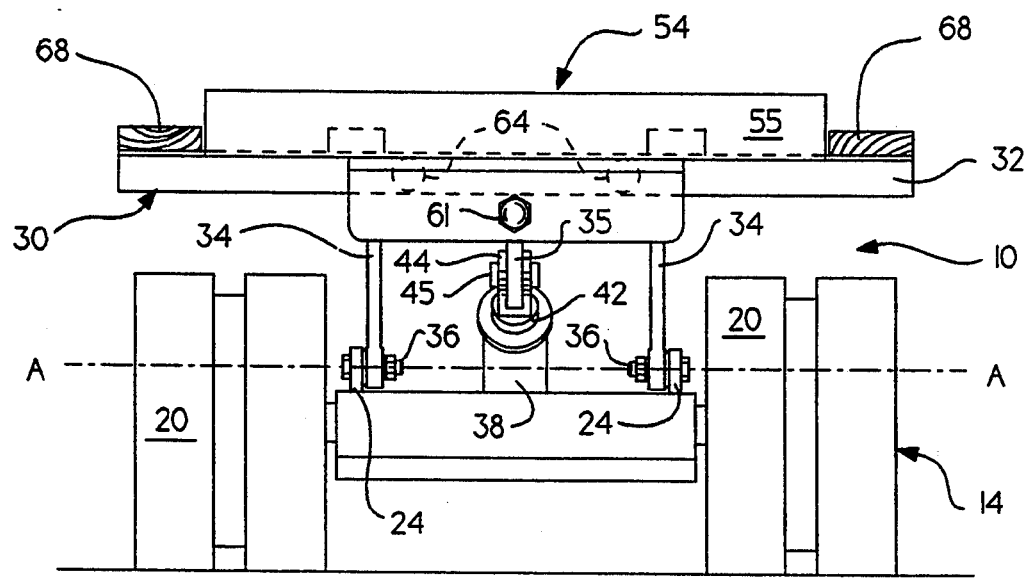
FIG. 6 is a front elevational view of the material handling apparatus of the present invention.
Figure 7:
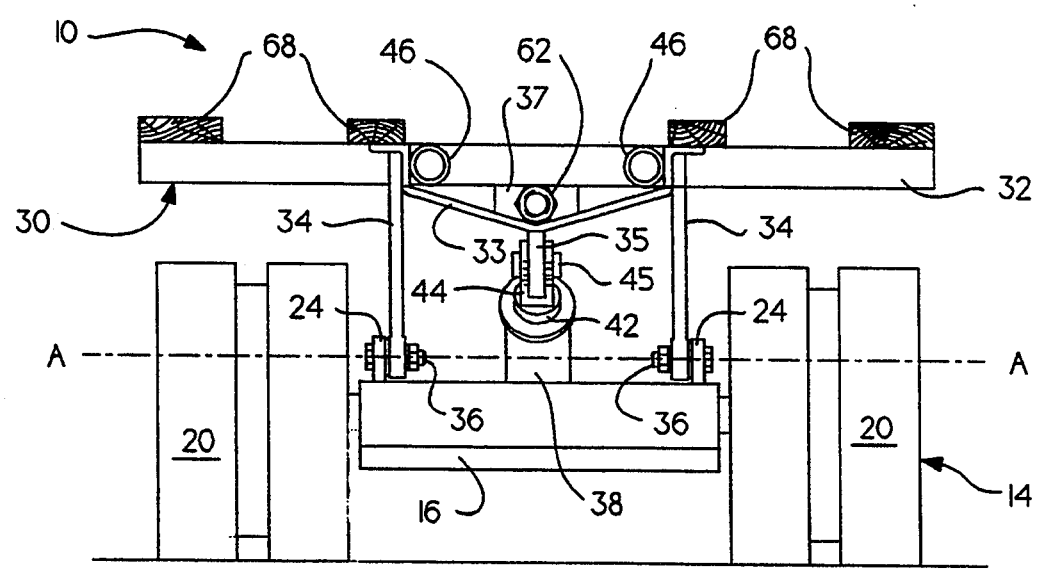
FIG. 7 is a front elevational view of the material handling apparatus with the foot support removed.

The frame 32 of the bed member 30 is pivotally attached to the frame 16 of the mobile carrier 14 such that it pivots about the axis A—A as most particularly shown in FIGS. 2, 6 and 7. Preferably, the frame 32 is attached to the carrier frame 16 by two pivot arms 34 as shown in FIGS. 3-7. To facilitate attachment of the pivot arms 34 to the carrier frame 16, upstanding attachment members 24 are preferably welded to the carrier frame 16 as shown in FIGS. 6 and 7. The pivot arms 34 and the upstanding attachment members 24 each have corresponding bores therethrough (not shown) that are adapted to receive pins or bolts 36 therethrough. It will be understood that the above-mentioned bores in the pivot arms 34 and the upstanding attachment members 24 are sized such that the pivot arms 34 may freely pivot about the corresponding pins or bolts 36. It will be further understood that the frame member 32 may be pivotally attached to the carrier frame 16 by a variety of other known fastening means such as, for example, bearing members (not shown) that are attached to the carrier frame 16 and are adapted to receive corresponding pivot pins (not shown) that are rigidly attached to the frame 32. Also when in the horizontal position depicted in FIG. 1, the bed member is supported above the tracks 20 by at least two upstanding support members 26 that are preferably welded to a cross member 17 of the carrier frame 16.

In the preferred embodiment, the bed 30 is pivoted between a horizontal position (See FIG. 3) and a vertical position (See FIG. 5) by a manually operated hydraulic cylinder 38. More specifically, a hydraulic cylinder having an extendable piston 42 therein is pivotally attached to the centrally located cross member 17 of the carrier frame 16 by a bolt or pin 39 that extends through a clevis 40 that is attached to the rear of the hydraulic cylinder 38. The end of the extendable piston 42 of the hydraulic cylinder 38 is preferably attached to the bed frame 32 by a similar clevis arrangement. More particularly, a clevis 44 is attached to the end of the extendable piston 42 as shown in FIGS. 4 and 5. A downwardly extending tongue member 35 is rigidly attached, preferably by welding, to a centrally located cross member 33 of the bed frame 32 as shown in FIG. 5 and is adapted to be pivotally received in the clevis 44. The clevis 44 has a bore (not shown) therethrough that corresponds with a bore (not shown) located in the tongue member 35 to receive a shoulder bolt or pin 45 therethrough. It will be understood that the above-described bores are sized so that the tongue member 35 may freely pivot around the bolt or pin 45 within the clevis 44.

A hydraulic fluid reservoir 48 supplies the hydraulic cylinder 38 with hydraulic fluid through a suitable hose 49 and is preferably attached to the carrier frame 16 by a bracket 50 that is bolted or welded to the carrier frame 16. The hydraulic fluid is pumped under pressure into the hydraulic cylinder 38 by manually pumping a handle member 52 that is removably attached to the hydraulic fluid reservoir 48. As the hydraulic fluid is pumped into the hydraulic cylinder 38, the extendable piston 42 is caused to extend from the hydraulic cylinder 38 thus causing the bed member 30 to pivot to a vertical position. In the preferred embodiment, the extendable piston member 42 is sized such that when fully extended, it causes the bed member 30 to pivot to a position wherein the bed member 30 is perpendicularly upright with respect to the carrier frame 16 and preferably to a position where the angle between the bed member 30 and the carrier frame 16 is slightly greater than 90 degrees to aid in unloading the headstone from the bed member 30. Because the hydraulic cylinder 38 functions similar to a hydraulic jack, it will be appreciated that the bed member 30 may be pivoted and retained at any angle between vertical and horizontal as designated by the arrow "B" on FIG. 4 by pumping the handle 52 until the bed 30 member reaches the desired position. To return the bed member 30 to the horizontal position, the fluid pressure is relieved from the cylinder by releasing a release screw (not shown) located on the hydraulic fluid reservoir 48 which permits the fluid to flow from the hydraulic cylinder 38 back into the hydraulic fluid reservoir 48; however, the hydraulic cylinder 38 may be modified to also lower the bed member 30. I have found the hydraulic hand pump—Model No. 3000 psi manufactured by Prince Manufacturing Co. of Sioux City, Iowa to be well suited for this application. However, those of ordinary skill in the art will appreciate that the manually operated hydraulic cylinder 38 may be replaced by a driven hydraulic or pneumatic cylinder arrangement where the size and weight of the load so require. It will be further appreciated that other means for pivotally actuating the bed member 30 between vertical and horizontal positions may be used. For example, motor driven lead screws and ball screws may also be used depending upon the characteristics of the materials being handled.

For supporting the headstone at varying heights above the ground level when the bed member 30 is in a vertical position with respect to the carrier frame 16 and to provide additional support to the headstone while the bed member 30 is being pivoted, a support foot, generally designated as 54 is provided as shown in FIG. 5. In particular, the support foot 54 has a base member 55 that is preferably fabricated from steel angle, however, other structural materials adapted to support the weight of the load being handled may also be used.

Extending from the rear of the base member 55 is a tab member 56 that is preferably welded thereto. A bore 57 is provided through the tab member 56 and is adapted to rotatably receive a shoulder portion 59 of a threaded rod or shoulder bolt 58 (See FIG. 5). In a preferred embodiment, the shoulder bolt 58 is rotatably connected to the tab member 56 by two washers 60 that are welded to the shoulder portion 59 on each side of the tab member 56. Thus the shoulder bolt 58 may be freely turned within the bore 57 by attaching a socket wrench to the head 61 of the shoulder bolt 58.

The free end of the shoulder bolt 58 is threadedly received in an internally threaded member or nut 62 that is non-rotatably attached to a support member 37 that is rigidly attached to the bed frame 32 of the bed member 30 (See FIGS. 5 and 7). Therefore, it will be understood that the support foot 54 may be moved in the directions indicated by the arrow "C" on FIG. 5 by advancing the shoulder bolt 58 into or out of the nut 62 with a socket wrench. Also, to prevent the support foot 54 from rotating with respect the end of the bed member 30 and to provide the base member 55 with additional lateral support, I prefer to attach two rod members 64 (See FIGS. 2 and 5) to the support foot 54 that are slidably received in two corresponding hollow members 46 that are fastened to the bed frame 32. More specifically, two hollow members 46 are preferably welded to the bed frame 32 as shown in FIG. 7. The rod members 64 are preferably welded to the support foot 54 and are free to slide within the corresponding hollow members 46 as the position of the support foot 54 is changed relative to the end of the bed member 30. It will be appreciated that the above-described configuration serves to prevent the support foot 54 from rotating when it is supporting a heavy load. Alternatively, the support foot 54 may be made adjustable by deleting the shoulder bolt 58 and providing corresponding transverse holes in each of the rods 64 and hollow members 46 and pins or bolts to lock such elements together in preselected lengths.

As discussed above, the base member 55 is preferably fabricated from steel angle as shown in FIG. 5. However, the base member 55 may also be provided with outwardly extending forks or similar shaped members of varying lengths and sizes that are adapted to support the desired load as the bed member 30 pivots to a vertical or angular position with respect to the carrier frame 16. Also, for the purpose of supporting and manipulating granite or marble headstones, I prefer to attach a padding material 66 (See FIG. 5) to the base member 55 to prevent the metal base member 55 from scratching or chipping the granite or marble. In the preferred embodiment, I have found a nylon fabric material that has a rubber backing attached thereto to be well suited for this application. However, those of ordinary skill the art will recognize that a variety of other materials such as, for example, nylon, wood or rubber would adequately serve that purpose depending upon the type of material being supported. In the preferred embodiment, the padding material 66 is attached to the base member 55 by countersunk screws (not shown) that will not damage or scratch the headstone. However, the padding material 66 may be fastened to the base member 55 by a variety of other known fastening means such as, for example, by gluing.

Also, to prevent the frame 32 of the bed member 30 from scratching the headstone, I prefer to attach cleat members 68 to the bed frame 32 as shown in FIGS. 2, 5, 6 and 7. In the preferred embodiment, the cleat members 68 are fabricated from pine wood and are removably attached to the bed frame 32 by counterbored bolts (not shown) that extend through the individual cleat member 68 and into a corresponding portion of the bed frame 32. I prefer to use pine wood cleats because the pine wood is soft enough to provide some cushion to the headstone yet it is rough enough to create a small amount of friction between the smooth polished surfaces of the headstone and the bed frame 32. In addition, the pine wood cleats are relatively inexpensive and may be easily replaced when damaged. It will be appreciated, however, the cleats 68 may be fabricated from other suitable materials that would provide the above described attributes to the bed frame 32. For example, rubber cleats that have a rough exterior surface and a rigid back might also be used.

Figure 8:
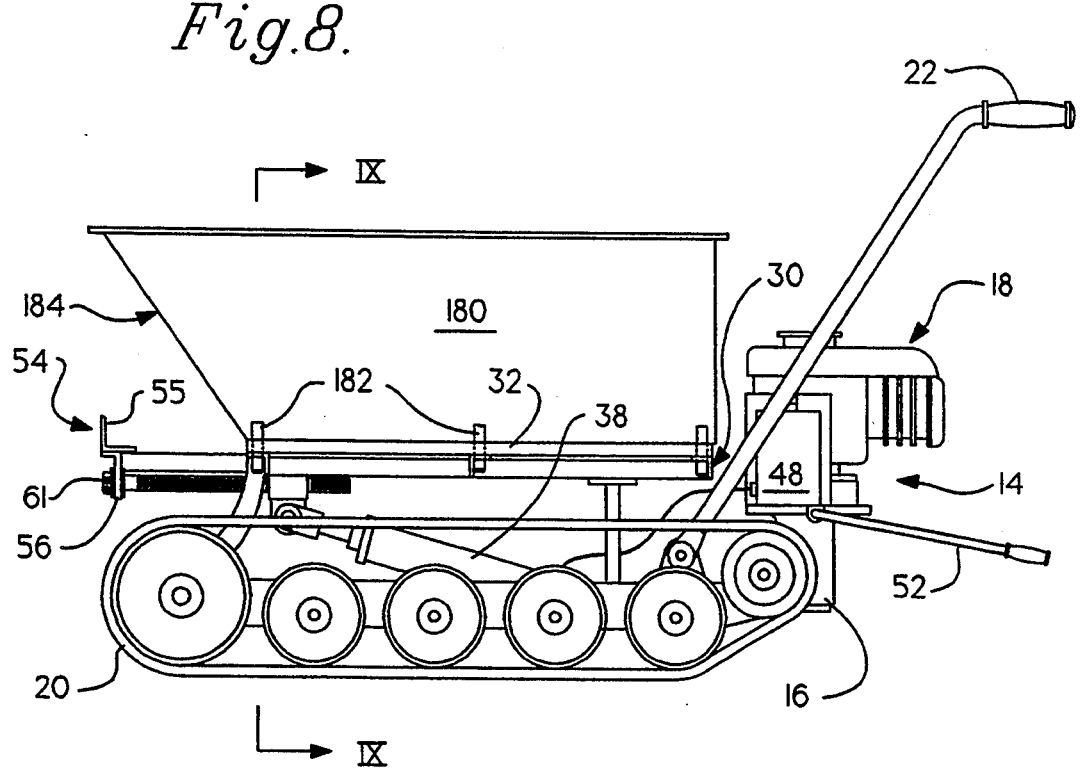
FIG. 8 is a side elevational view of another embodiment of the material handling apparatus of the present invention.
Figure 9:
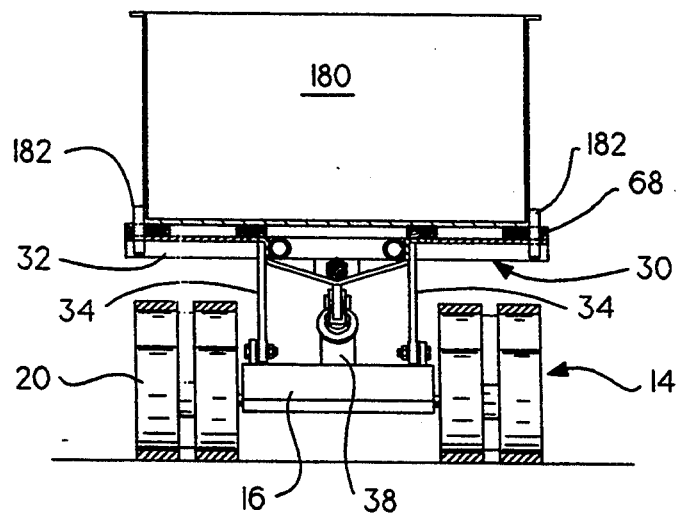
FIG. 9 is a front elevational view of the material handling apparatus of FIG. 8 taken along line IX—IX in FIG. 8.

In another embodiment of the present invention, as shown in FIGS. 8 and 9, a container 180 is removably attached to the bed member 30. The container 180 is preferably constructed of metal material and forms a water-tight vessel for hauling, for example, mixed concrete solutions or dirt therein. In addition, the container 180 is preferably constructed from suitable material such as steel to enable it to withstand the load and abuse commonly associated with hauling crushed stone and gravel used to create headstone pads and foundations.

The container 180 is removably attached to the bed frame 32 by a series of pins 182 that are preferably welded to the exterior of the container 180 and are received in corresponding bores (not shown) in the cleats 68 and bed frame member 32. That arrangement enables the container 180 to be easily removed from the bed member 30 without the use of hand tools. Those of ordinary skill in the art, however, will recognize that the container 180 may be removably attached to the bed member 30 by a variety of other known methods of fastening such as, for example, bolts and screws.

As most particularly shown in FIG. 8, the front end 184 of the container 180 is preferably angled to enable the contents of the container 180 to be dumped therefrom as the bed member 30 is pivoted to a vertical position. Therefore, the stone setter may move the material handling apparatus 10 of the present invention adjacent to a foundation hole or ditch and cause the load of concrete, gravel, etc. to be dumped therein by operating the hydraulic cylinder 38 to thus cause the bed member 30 and container 180 to pivot to a vertical position and dump the load of material.

The present invention, as described above, will enable one to transport and manipulate a headstone in a more time efficient and safe manner than the methods and apparatus known and used in the industry for performing those operations. For example, the present invention is most particularly advantageous over the prior methods when using a crane to transfer the headstone from the truck to the carrier. In particular, to unload a headstone from a truck onto the material handling apparatus 10 of the present invention, the mobile carrier 14 is moved adjacent to the truck in a position that is well within the reach of the crane. The bed member 30 is then pivoted to a vertical or semi-vertical position by manually operating the hydraulic cylinder 38. The headstone is then attached to the crane by, for example, slings and is then transferred by the crane to the support foot 54 of the upstanding bed member 30. The slings are then removed from the headstone and the headstone is then transferred to a horizontal transportable position on the mobile carrier 14 by relieving the hydraulic pressure to the hydraulic cylinder 38 in a controlled manner and thus permitting the bed member 30 to pivot to a horizontal position on the mobile carrier 14. By unloading the headstone in this controlled manner, it will be appreciated that the risk of personnel injury and damage to the headstone is greatly decreased over the other known methods of unloading headstones.

After the headstone has been placed onto the bed member 30, it can be transported directly to the grave site. The self-propelled mobile carrier 14 enables the headstone to be easily transported up hills and around adjacent headstones without the manual labor and struggle commonly associated with those procedures. Once the headstone has been transported to the grave site, the position of the support foot 54 must be adjusted relative to the end of the bed member 30 by turning the shoulder bolt 58. The position of the support foot 54 will depend on whether the headstone is to be set directly on the ground or whether it is to be set onto a pad or foundation member extending above the ground level. After the support foot 54 has been properly adjusted, the bed member 30 is caused to pivot to a position just beyond vertical by manually operating the hydraulic cylinder 38 as was discussed above. After the headstone has come to a rest on the ground or the base, whichever the case may be, the headstone is steadied in a slightly tilted position by a stone setter while the material handling apparatus 10 is backed out from under the headstone. It will be appreciated that the material apparatus 10 of the present invention can set the headstones on bases of various heights that are beyond the upper adjustable reach of the support foot 54 by fabricating a ramp (not shown) onto which the mobile carrier 10 can be positioned.

The present invention can also be used to transport headstones from the grave site back to the truck for eventual transfer to the manufacturer for repair or refurbishing. To use the present invention in this manner, the bed member 30 is pivoted to a position wherein the angle between it and the carrier frame 16 is slightly greater than 90 degrees. The mobile carrier 14 is then moved adjacent to the headstone such that the base member 55 of the support foot 54 is positioned to receive the bottom of the headstone. The headstone is then tilted to cause the bottom edge of the headstone to be slightly raised above the base member to provide clearance for the base member 55 to be positioned thereunder by moving the mobile carrier 14. Thereafter, the bed member 30, now carrying the headstone thereon, is slowly lowered to the horizontal position by relieving the hydraulic pressure to the hydraulic cylinder 38. In this manner, the headstone is loaded onto the material handling apparatus 10 in a controlled manner to thus avoid injury to the stone setters and further damage to the headstone.

Figure 10:
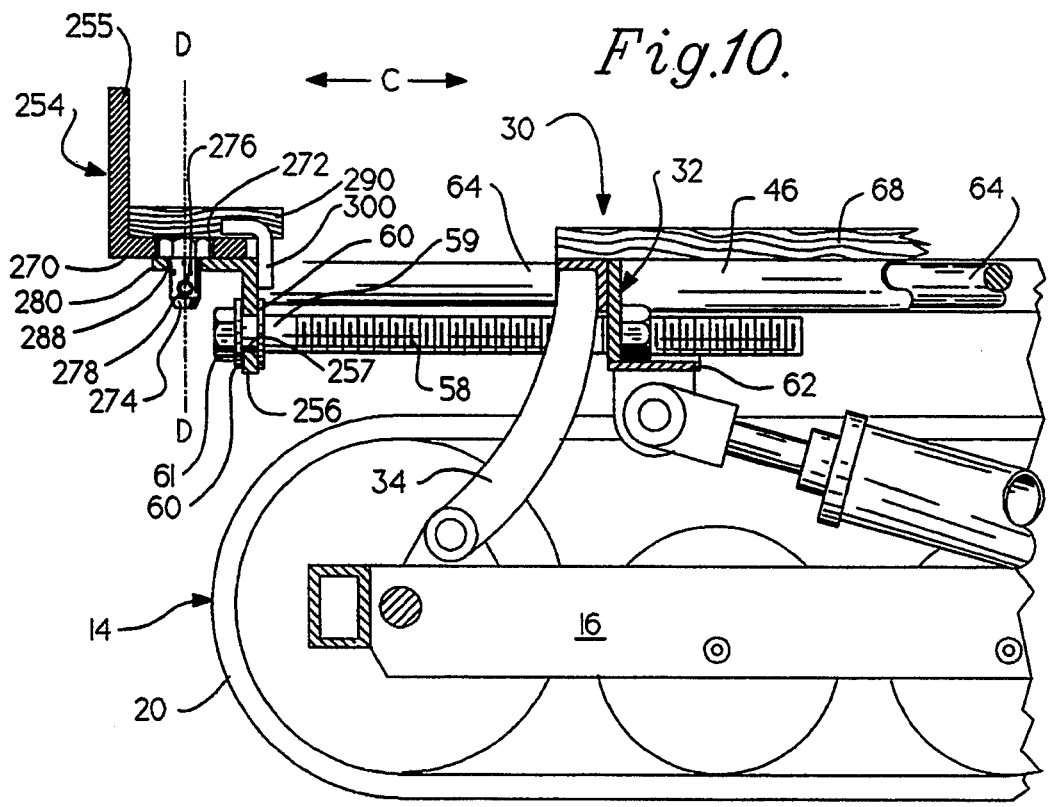
FIG. 10 is a partial side elevational view of another embodiment of the material handling apparatus of the present invention showing some elements in cross-section.
Figure 11:
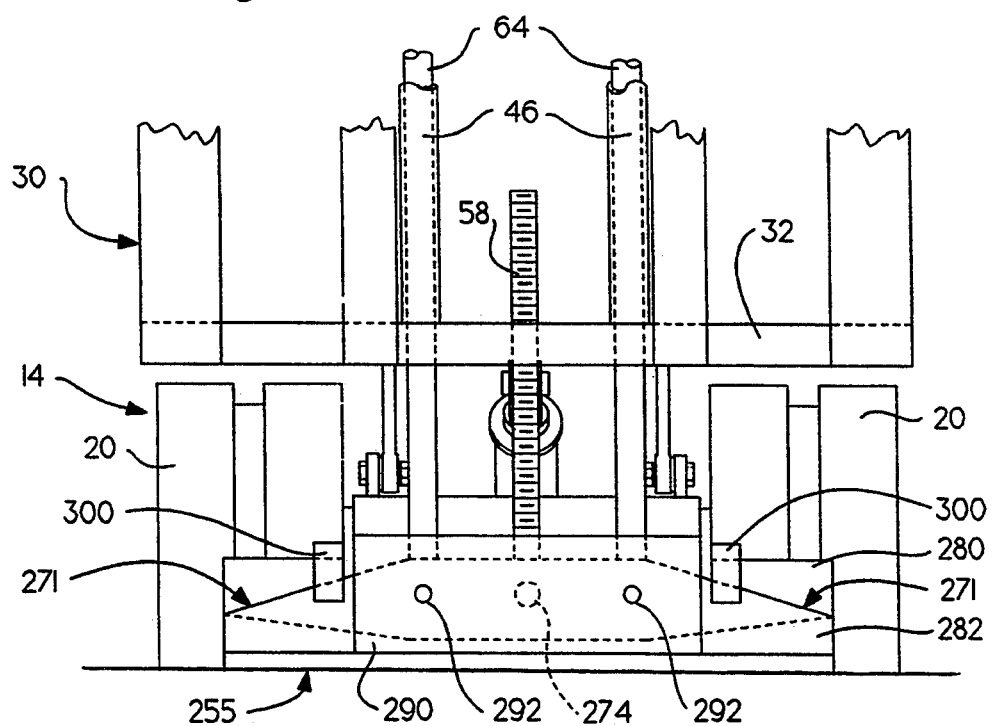
FIG. 11 is a partial front elevational view of the material handling apparatus of FIG. 10.
Figure 12:
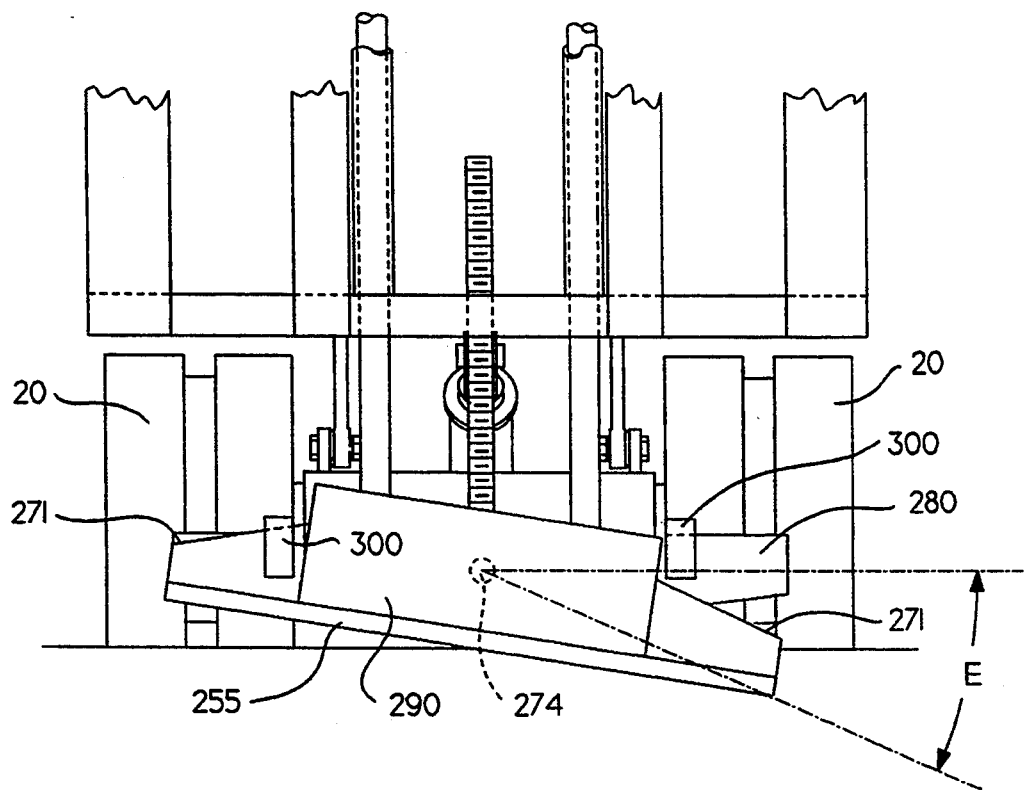
FIG. 12 is another partial front elevational view of the material handling apparatus of FIGS. 10 and 11 illustrating the preferred range of pivotal travel of the support foot thereof.

In yet another embodiment of the present invention as shown in FIGS. 10–12, the support foot 254 is pivotally attached to the bed member 30 to enable it to pivotally assume various lateral angular orientations with respect to the bed member 30 when working on uneven terrain. More specifically, and with reference to FIG. 10, there is provided a rear plate member 280 that has a tab member 256 attached thereto. Tab member 256 has a bore 257 therethrough that is adapted to rotatably receive a shoulder portion 59 of a threaded rod or shoulder bolt 58. The shoulder bolt 58 is rotatably connected to the tab member 256 by two washers 60 that are welded to the shoulder portion 59 on each side of tab member 256. Thus, the shoulder bolt 58 may be freely turned within the bore 257 by attaching a socket wrench to the head 61 of the shoulder bolt 58.

As was previously described hereinabove, the free end of the shoulder bolt 58 is threadedly received in an internally threaded member or nut 62 that is rigidly attached to the bed frame 32 of the bed member 30. See FIG. 10. Therefore, it will be understood that the rear plate member 280 and the base member 255 that is pivotally attached thereto may be moved in the directions indicated by the arrow "C" on FIG. 10 by advancing the shoulder bolt 58 into or out of the nut 62 with a socket wrench.

In addition, in this embodiment, the rear plate member 280 is preferably prevented from pivoting with respect to the end of the bed member 30 by rod members 64. In particular, rod members 64 are attached to the rear plate member 280, preferably by welding, and are each slidably received in a corresponding hollow member 46 that is preferably welded to the bed frame 32. It will be understood that the rod member configuration described immediately above provides lateral support to the rear plate member 280 and serves to prevent the rear plate member 280 from rotating with respect to the bed member 30. Also, in the alternative, the rear plate member 280 and ultimately the base member 255 may be made adjustable with respect to the bed member 30 by deleting the shoulder bolt 58 and providing corresponding transverse holes in each of the rods 64 and hollow members 46 and pins or bolts to lock these elements together in preselected positions.

The base member 255 is preferably fabricated from steel angle; however, the base member 255 may also be provided with outwardly extending forks or similar shaped members of varying lengths and sizes that are adapted to support the desired load as the bed member 30 pivots to a vertical or angular position with respect to the carrier frame 16. In this embodiment, the base member 255 is pivotally attached to the rear plate member 280 preferably by a bolt/pin arrangement as shown in FIG. 10. More specifically, the angularly-shaped base member 255 has an upwardly extending leg portion 270 that has a bore 272 extending therethrough. A bolt or pin member 274 is inserted through the bore 272 and the head portion thereof is preferably welded to the leg portion 270 in that position so that the head is flush with the inner surface of the leg portion 270. The skilled artisan will recognize, however, that the pin member 274 may be fastened to the leg portion 270 by a variety of other fastening methods.

Pin member 274 is adapted to pivotally extend through a corresponding bore 288 located in the rear plate member 280 and is removably retained therein by a second pin 278 that extends through a bore 276 in one end of pin 274. As such, it will be appreciated that the pin arrangement described immediately above permits the base member 255 to laterally pivot with respect to the bed member 30 about axis "D—D" as shown in FIG. 10. In this embodiment, I prefer to attach padding material 290 (i.e., 2"×4"×12" block of pine wood) to the base member 255 by countersunk bolts or screws 292 as shown in FIG. 11. Those of ordinary skill in the art will appreciate, however, that other types of padding materials may be used to prevent the base member 255 from scratching or damaging the item being supported thereby.

Those of ordinary skill in the art will appreciate that the above-described pivoting base member arrangement provides an apparatus that is particularly well adapted for manipulating headstones onto foundations located on sloping or uneven terrain. In particular, as was discussed above, after the headstone has been placed onto the bed member 30, it is transported in a horizontal position to a location adjacent the grave site. Once the headstone has been transported to the grave site, the position of the base member 255 must be adjusted relative to the end of the bed member 30 by turning the shoulder bolt 58. The position of the base member 255 will depend on whether the headstone is to be set on an upstanding foundation or directly on the ground. If the headstone is to be placed on an upstanding foundation, the mobile carrier 14 must be positioned adjacent the foundation and the position of the base member 255 must be adjusted so that when the bed member 30 is pivoted to a position slightly beyond vertical with respect to the carrier frame 16, the headstone overhangs the foundation.

After the mobile carrier 14 and the base member 255 have been properly located, the bed member 30 is caused to pivot to a position just beyond vertical by manually operating the hydraulic cylinder 38. As the bed member 30 reaches a substantially vertical position, the weight of the headstone is substantially borne by the base member 255 that is pivotally attached to the bed member 30 by means of rear plate member 280 and pin member 274. It will be appreciated that the weight of the headstone will cause the base member 255 to pivot about pin member 274 with respect to the bed member 30 until the overhanging portion of the headstone contacts the foundation at which point the headstone is removed from the base member by carefully sliding and maneuvering the headstone onto the foundation. It will therefore be appreciated that the aforementioned pivotal support arrangement permits the headstone to be safely placed onto a foundation located on uneven terrain without the necessity of building temporary cribbing to support the carrier 14 at a desired angle.

Also in this embodiment, as shown in FIGS. 10-12, I prefer to attach "U"-shaped retainer brackets 300 to the rear plate member 280 for limiting the pivotal motion of the base member 255. More specifically, the upstanding leg portion 270 of base member 255 has angled end portions 271 that cooperate with the "U"-shaped retainer brackets 300 to limit the pivotal motion of the base member 255. See FIGS. 11 and 12. As can be seen in FIG. 10, the "U"-shaped retainer brackets 300 are attached to the rear plate member 280 (preferably by welding) so that the angled end portions 271 of the base member 255 can pass thereunder. In the preferred embodiment, the angle designated as "E" in FIG. 12 is approximately 30°. Those of ordinary skill in the art will readily appreciate, however, that the pivotal motion of the support base 255 can be limited to a variety of different pivotal angles by altering the position of the retainer brackets 300 and/or the shape of the angled end portions 271.

Figure 15:
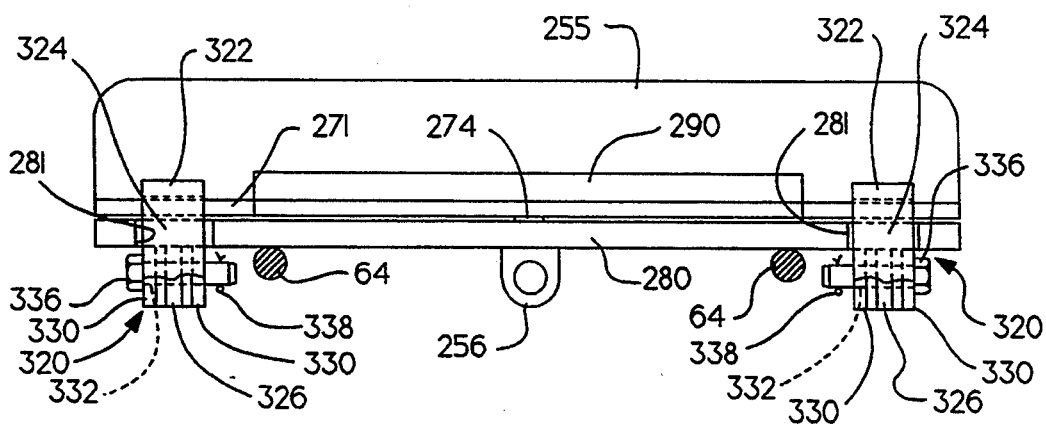
FIG. 15 is a top view of the support foot arrangement of the material handling apparatus of FIGS. 13 and 14.
Figure 13:
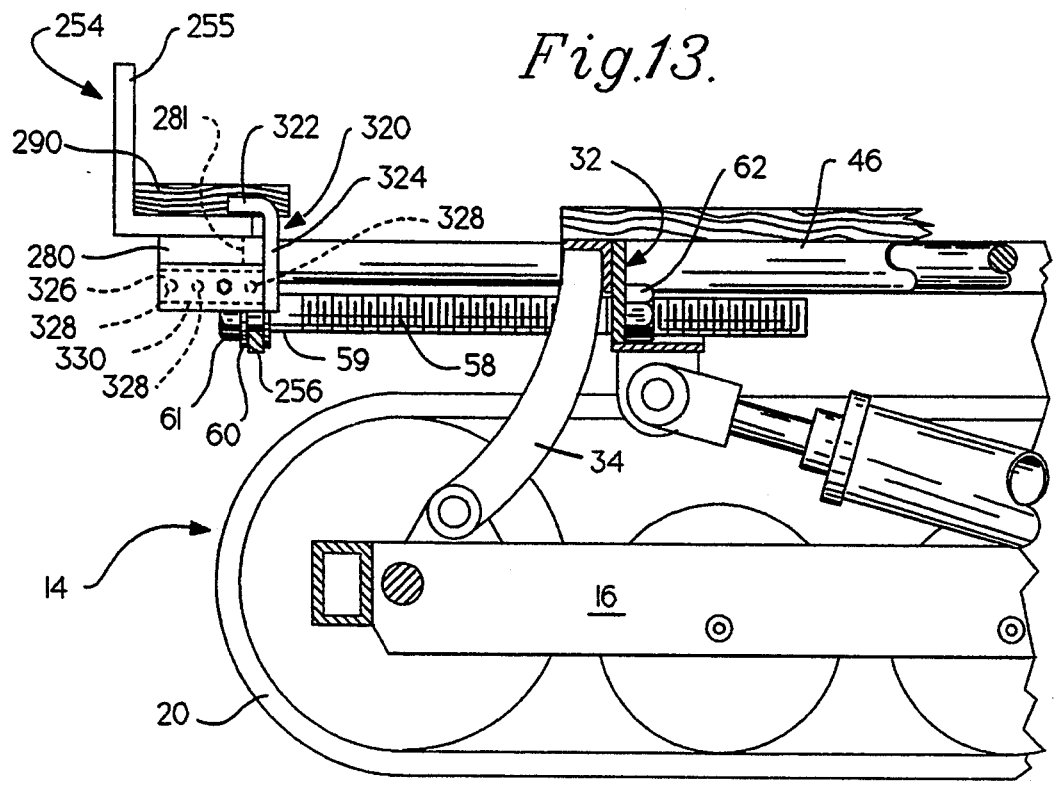
FIG. 13 is a partial side elevational view of another embodiment of the material handling apparatus of the present invention showing some elements thereof in cross-section.
Figure 14:
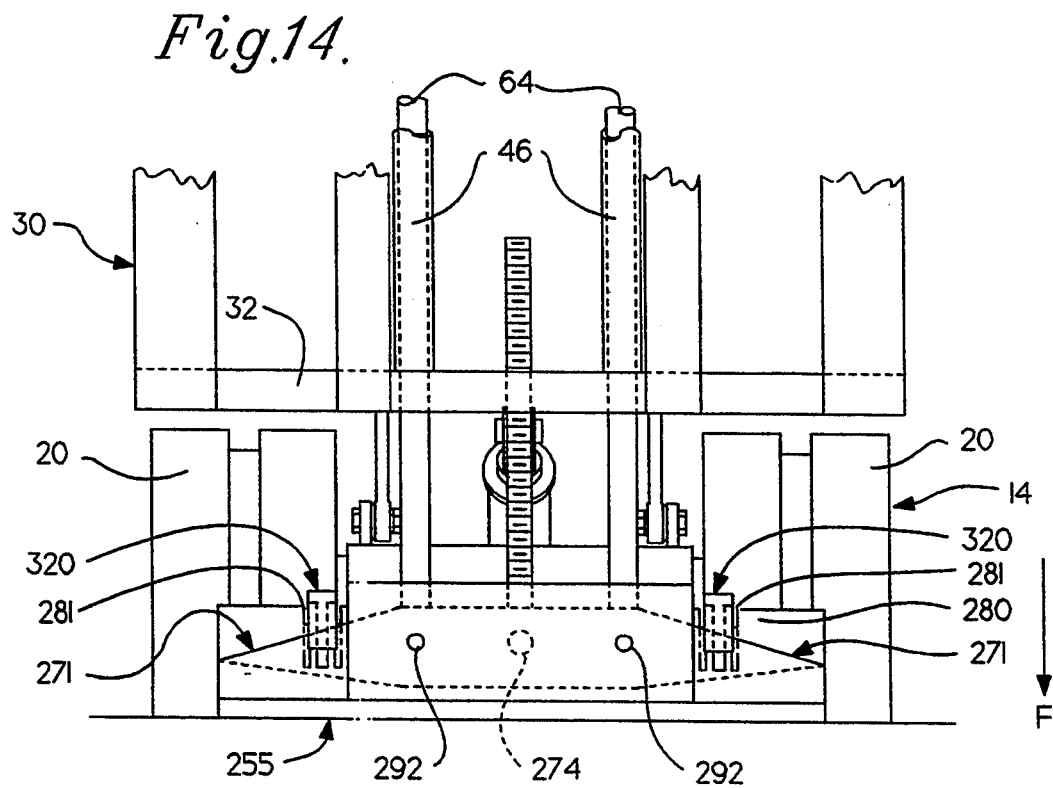
FIG. 14 is a partial front elevational view of the material handling apparatus of FIG. 13.

In yet another embodiment, as illustrated in FIGS. 13-17, the retainer brackets 320 are not rigidly fastened to the rear plate member 280, but, instead, are selectively adjustable with respect to the rear plate member 280 to enable the pivotal motion of the base member 255 to be limited to predetermined ranges of angular motion. In particular, as can be seen in FIGS. 13-15, the rear plate member 280 has two sets of Spaced-apart attachment plates 330 attached thereto preferably by welding. The attachment plates 330 are each provided with a bore 332 therein with the bore 332 of one attachment plate 330 coaxially aligning with the bore 332 of the corresponding attachment plate 330 paired therewith.

Figure 16:
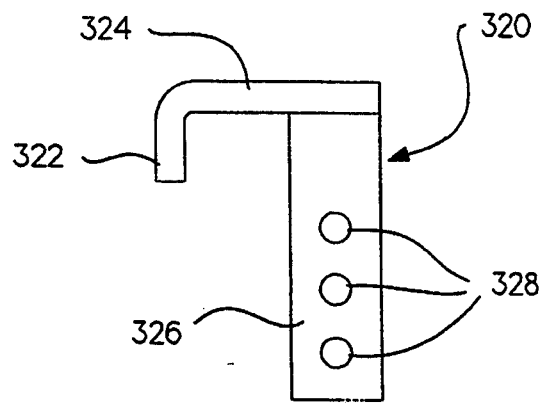
FIG. 16 is a side elevational view of the adjustable retainer bracket of the material handling apparatus of FIGS. 13-15.
Figure 17:
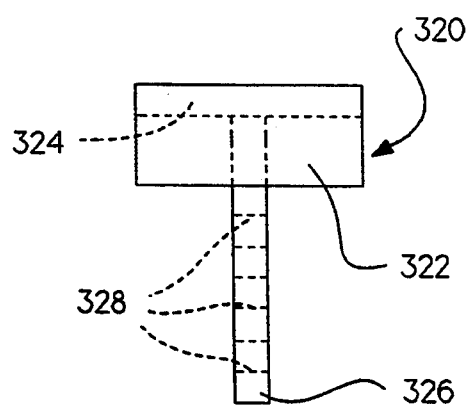
FIG. 17 is a front elevational view of the adjustable retainer bracket of FIG. 16.

As most particularly shown in FIGS. 16 and 17, the retainer brackets 320 each have a front retainer portion 322, a top portion 324 and a downwardly extending fastener arm 326. As can be seen FIGS. 13 and 14, the fastener arm 326 is adapted to be slidably received between a pair of spaced-apart attachment plates 330. Each fastener arm 326 has a plurality of bores 328 (preferably three) extending therethrough that are adapted to correspond with the bores 332 located in the corresponding attachment plates 330 so that a retaining pin 336 may be inserted therethrough. See FIG. 13 and FIG. 15. The retaining pin 336 is removably retained within bores 332 and one bore 328 by a cotter key or pin 338 that extends through the retaining pin 336 as shown in FIG. 15.

The skilled artisan will appreciate that the above-described method of attaching the retainer brackets 320 to the rear plate 280 permits each retainer bracket 320 to be adjusted in the directions depicted by arrow "F" in FIG. 14. In addition, to facilitate the downward adjustment of the retainer brackets 320, as shown in FIG. 14, the rear plate member 280 is preferably provided with notches 281 into which the retaining brackets 320 may extend. As such, it will be appreciated that by adjusting both of the retaining brackets 320, the support base 255 can be locked in a variety of predetermined angular orientations. For example, the retainer brackets 320 can be pinned in position so as to retain the support base 255 in a substantially horizontal position. After the bed has been adjusted to a substantially vertical or slightly beyond vertical position so that a portion of the headstone being carried thereon overhangs the foundation, the appropriate retaining bracket 320 can be released by removing the corresponding retaining pin 336 to permit the base 255 and the headstone to pivot to position wherein the headstone is received on the foundation.

It will be appreciated that the above-described embodiments of the present invention enable heavy articles such as headstones to be safely transported and manipulated to a variety of different positions and locations and is particularly advantageous for placing such articles on the surface of a foundations that is not substantially parallel with the terrain upon which the carrier is traversing. Accordingly, the present invention provides a method and apparatus for solving the problems commonly associated with transporting and manipulating headstones. It will be understood, however, that various changes in the details, materials and arrangements of parts which have been herein described and illustrated in order to explain the nature of the invention may be made by those skilled in the art within the principle and scope of the invention as expressed in the appended claims.

I claim:

1. A material handling apparatus for transporting and manipulating a load on a surface, comprising:
    a mobile carrier having a frame;
    load supporting means attached to said carrier frame for pivotal movement about a lateral axis, said load supporting means constructed to move between a first position adjacent to said carrier frame and a second position wherein it is substantially perpendicular to said carrier frame;
    means for selectively moving said load supporting means between said first and second positions; and
    vertical support means movably attached to said load supporting means for selectively supporting said load at a predetermined height with respect to the surface when said load supporting mean is in said second position, said vertical support means being pivotally attached to said load supporting means for pivotal movement about an axis which is substantially perpendicular to said lateral axis for selectively supporting said load at a predetermined angle with respect to the surface when said load supporting means is in said second position.

2. The material handling apparatus recited in claim 1 wherein said mobile carrier is self-propelled.

3. The material handling apparatus recited in claim 2 wherein the means for selectively moving said load support means between said first and second positions comprises a hydraulic cylinder.

4. The material handling apparatus recited in claim 3 wherein said vertical support means further comprises:
    a support member movably attached to said load supporting means adjacent to the end thereof;
    adjustment means for selectively adjusting the position of said support member with respect to the end of the load supporting means; and
    lateral support means for preventing said support member from rotating with respect to the load support means.

5. The material handling apparatus recited in claim 4 wherein said adjustment means comprises screw means rotatably attached to said support member and threadedly attached to said load supporting means such that by rotating said screw means the position of said support member may be selectively adjusted with respect to the end of said load supporting means.

6. The material handling apparatus recited in claim 5 wherein said lateral support means comprises:
    at least one rod member attached to said support member parallel to said screw means; and
    at least one receptacle member corresponding with said rod member and being attached to said load support means, said receptacle member being constructed to slidably receive said corresponding rod member therein.

7. The material handling apparatus recited in claim 1 further comprising a load carrying container attached to said load supporting means and being capable of being removed therefrom.

8. The material handling apparatus recited in claim 7 wherein said container has an angled front end to enable the load contained therein to be dumped therefrom as said load supporting member is pivoted from said first position to said second position.

9. The material handling apparatus recited in claim 1 further comprising means for restricting the pivotal movement of said vertical support means to a predetermined range of pivotal travel with respect to said load supporting means.

10. The material handling apparatus recited in claim 1 wherein said means for restricting the pivotal movement of said vertical support means, to a predetermined range of pivotal travel comprises at least one "U"-shaped member attached to said load supporting means, said "U"-shaped member being adapted to engage said vertical support means when said vertical support means has pivoted to a predetermined position.

11. The material handling apparatus recited in claim 1 further comprising means for selectively restricting the pivotal movement of said vertical support means to one of a plurality of predetermined ranges of pivotal travel with respect to said load supporting means.

12. The material handling apparatus recited in claim 11 wherein said means for selectively restricting the pivotal movement of said vertical support means comprises at least one "U"-shaped member movably attached to said load supporting means, said "U"-shaped member adapted to be selectively rigidly affixed to said load supporting member at a plurality of predetermined positions wherein said "U"-shape shaped member can restrict the pivotal motion of said vertical support means.

13. A material handling apparatus adapted to be supported by a mobile carrier having a frame and being adapted to transport and manipulate a load on a surface, comprising:
load supporting means attached to said carrier frame for pivotal movement about a lateral axis, said load supporting means constructed to move between a first position adjacent to said carrier frame and a second position wherein it is substantially perpendicular to said carrier frame;
means for selectively moving said load supporting means between said first and second position; and
vertical support movably attached to said load supporting means for selectively supporting said load at a predetermined height with respect to the surface when said load supporting means is in said second position, said vertical support means being pivotally attached to said load supporting means for pivotal movement about an axis which is substantially perpendicular to said lateral axis for selectively supporting said load at a predetermined angle with respect to the surface when said load supporting means is in said second position.

14. The material handling apparatus recited in claim 13 wherein said load supporting means is pivotally attached to said carrier frame and wherein said means for selectively moving said load support means between said first and second positions comprises a hydraulic cylinder.

15. The material handling apparatus recited in claim 13 wherein said vertical support means further comprises:
a support member movably attached to said load supporting means adjacent to the end thereof;
adjustment means for selectively adjusting the position of said support member with respect to the end of the load supporting means; and
lateral support means for preventing said support member from rotating with respect to the load support means.

16. The material handling apparatus recited in claim 14 wherein said adjustment means comprises screw means rotatably attached to said support member and threadedly attached to said load supporting means such that by rotating said screw means the position of said support member may be selectively adjusted with respect to the end of said load supporting means.

17. The material handling apparatus recited in claim 15 wherein said lateral support means comprises:
at least one rod member attached to said support member parallel to said screw means; and
at least one receptacle member corresponding with said rod member and being attached to said load support means, said receptacle member being constructed to slidably receive said corresponding rod member therein.

18. The material handling apparatus recited in claim 13 further comprising a load carrying container attached to said load supporting means and being capable of being removed therefrom.

19. A material handling apparatus for transporting and manipulating an object on a surface, comprising:
a self-propelled carrier having a frame;
a bed member attached to said carrier frame for pivotal movement about a lateral axis, said bed member being pivotal between a first position adjacent to said carrier frame and a second position wherein it is substantially perpendicular to said carrier frame;
cylinder means attached to said carrier frame and said bed member, said cylinder means being constructed to selectively pivot said bed member between said first and second positions;
a plate member adjustly attached to one end of said bed member by a screw member and at least one rod member that is attached to said plate member and is slidable received in a corresponding receptacle member attached to said bed member; and
a support member attached to said plate member for pivotal movement about an axis which is substantially perpendicular to said lateral axis such that said support member is selectively adjustable with respect to the end of said bed member so that when said bed member is in said second position, said support member supports said object at a predetermined height and angle with respect to said surface.

20. A method for transporting an article to a desired location at a predetermined height and angle above a surface, comprising the step of:
providing a mobile carrier with a frame and a load supporting means attached to said carrier frame for pivotal movement about a lateral axis, said load supporting means being selectively pivotable between a first position wherein said load supporting means is adjacent to said carrier frame and a second position wherein said load supporting means is substantially perpendicular to said carrier frame, said load supporting means further having a vertical support member movably attached thereto and constructed to selectively support said article at a predetermined height with respect to said surface when said load supporting means is in said second position, said vertical support member being pivotally attached to said load supporting means for pivotal movement about an axis which is substantially perpendicular to said lateral axis for selectively supporting the article at a predetermined angle with respect to said surface when said load supporting means is in said second position;
adjusting the position of the vertical support means to support said article at said predetermined height when said load supporting means is in said second position;
placing said article on said load supporting means;
moving the mobile carrier to a desired location;
pivoting said load support means to said second position; and removing said article from said vertical support member.

21. A method for removing an article from an elevated location and transporting the article to a desired location comprising the steps of:

providing a mobile carrier with a frame and a load supporting means attached to said carrier frame for pivotal movement about a lateral axis, said load supporting means being selectively pivotable between a first position wherein said load supporting means is received on said carrier frame and a second position wherein said load supporting means is substantially perpendicular to said carrier frame, said load supporting means further having a vertical support means movably attached thereto and constructed to selectively support said article at a predetermined height when said load supporting means is in said second position said vertical support means being pivotally attached to said load supporting means for pivotal movement about an axis which is substantially perpendicular to said lateral axis which for selectively supporting the article at a predetermined angle with respect to said surface when said load supporting means is in said second position, moving said mobile carrier adjacent to said elevated location;

pivoting said load support means to said second position;

adjusting the vertical support means to a predetermined height and angle which is substantially equivalent to the height and angle of the elevated location;

moving said article onto said vertical support means;

pivoting said load support means to said first position; and moving said mobile carrier to said desired location.

* * * * *

UNITED STATES PATENT AND TRADEMARK OFFICE
CERTIFICATE OF CORRECTION

PATENT NO. : 5,380,140
DATED : January 10, 1995
INVENTOR(S) : Gerald B. Johnson It is certified that error appears in the above-identified patent and that said Letters Patent is hereby corrected as shown below:

Col. 8, line 55, after "skill", insert --in--.

Col. 14, line 63, delete "1" and insert --9--.

Col. 18, line 3, delete "which".

Signed and Sealed this

Thirtieth Day of May, 1995

Attest:

BRUCE LEHMAN

Attesting Officer     Commissioner of Patents and Trademarks